United States Patent
Gupta

(10) Patent No.: US 9,631,698 B2
(45) Date of Patent: Apr. 25, 2017

(54) CRIMPING BEAD WITH PLUNGER

(71) Applicant: Nikhil Gupta, Schaumburg, IL (US)

(72) Inventor: Nikhil Gupta, Schaumburg, IL (US)

( * ) Notice: Subject to any disclaimer, the term of this patent is extended or adjusted under 35 U.S.C. 154(b) by 90 days.

(21) Appl. No.: 14/156,997

(22) Filed: Jan. 16, 2014

(65) Prior Publication Data

US 2014/0310919 A1    Oct. 23, 2014

Related U.S. Application Data

(60) Provisional application No. 61/754,337, filed on Jan. 18, 2013.

(51) Int. Cl.
*F16G 11/02*    (2006.01)

(52) U.S. Cl.
CPC ............. *F16G 11/02* (2013.01); *Y10T 24/398* (2015.01)

(58) Field of Classification Search
CPC .......... F16G 11/10; F16G 11/00; F16G 11/14; A41F 1/06; A42B 7/00; A43B 3/0005; A43C 7/00; A44B 99/00; A45C 15/06; A45F 2005/002; A45F 2005/023; A45F 5/02; B62B 7/123; B62B 9/104; E06B 9/327
USPC ........ 24/115 A, 115 G, 115 H, 115 R, 115 L, 24/131 C, 136 A, 136 R
See application file for complete search history.

(56) References Cited

U.S. PATENT DOCUMENTS

| | | | | |
|---|---|---|---|---|
| 4,288,891 A | * | 9/1981 | Boden | F16G 11/10 24/115 G |
| 4,453,292 A | * | 6/1984 | Bakker | F16G 11/10 24/115 G |
| 5,195,218 A | * | 3/1993 | Joseph | F16G 11/00 24/129 D |
| 5,197,166 A | * | 3/1993 | Meier | F16G 11/10 24/115 G |
| 5,208,950 A | * | 5/1993 | Merritt | F16G 11/14 24/115 H |
| 5,345,657 A | * | 9/1994 | Shimizu | F16G 11/10 24/115 G |
| 5,440,788 A | * | 8/1995 | Boden | F16G 11/00 24/115 H |
| 5,611,118 A | * | 3/1997 | Bibbee | A42B 7/00 2/195.1 |
| 5,657,513 A | * | 8/1997 | Takahashi | F16G 11/10 24/115 G |
| 5,666,699 A | * | 9/1997 | Takahashi | F16G 11/10 24/115 G |
| 5,711,032 A | * | 1/1998 | Carpenter | A41F 1/06 2/158 |

(Continued)

*Primary Examiner* — Robert J Sandy
*Assistant Examiner* — David Upchurch
(74) *Attorney, Agent, or Firm* — Robert S. Alexander; Ferrells, PLLC; Anna L. Kinney

(57) ABSTRACT

A two piece crimping bead is provided. The crimping bead has a crimp bead and a crimping plunger. The crimp bead has a through bore with a first opening, a second opening, and a sidewall. The through bore is adapted to have beading cable passed therethrough. The crimping bead also has a crimping bore intersecting the through bore. The crimping plunger is disposed therein in interference fit with the crimping bore. When the crimping plunger is urged into the crimping bore, the crimping plunger retains the beading cable against the sidewall of the through bore.

12 Claims, 4 Drawing Sheets

(56) References Cited

U.S. PATENT DOCUMENTS

| | | | | |
|---|---|---|---|---|
| 5,896,623 | A * | 4/1999 | Martin | F16L 3/233 |
| | | | | 24/115 G |
| 6,189,186 | B1 * | 2/2001 | Boden | F16G 11/14 |
| | | | | 24/115 H |
| 6,471,222 | B1 * | 10/2002 | Hsia | B62B 9/104 |
| | | | | 280/47.4 |
| 7,257,865 | B2 * | 8/2007 | Kaneko | A44B 99/00 |
| | | | | 24/115 G |
| 7,337,503 | B1 * | 3/2008 | Ashbrook | E06B 9/327 |
| | | | | 24/115 G |
| 7,722,219 | B2 * | 5/2010 | Hartley | A43B 3/0005 |
| | | | | 24/115 G |
| 2002/0074093 | A1 * | 6/2002 | Bryant | E06B 9/324 |
| | | | | 160/168.1 R |
| 2006/0213037 | A1 * | 9/2006 | Yoshiguchi | F16G 11/10 |
| | | | | 24/115 G |
| 2008/0098574 | A1 * | 5/2008 | Kim | F16G 11/10 |
| | | | | 24/132 WL |
| 2009/0188634 | A1 * | 7/2009 | Hoffmann | E06B 9/324 |
| | | | | 160/332 |
| 2011/0192014 | A1 * | 8/2011 | Holmes, Jr. | F41H 5/013 |
| | | | | 29/525.01 |

* cited by examiner

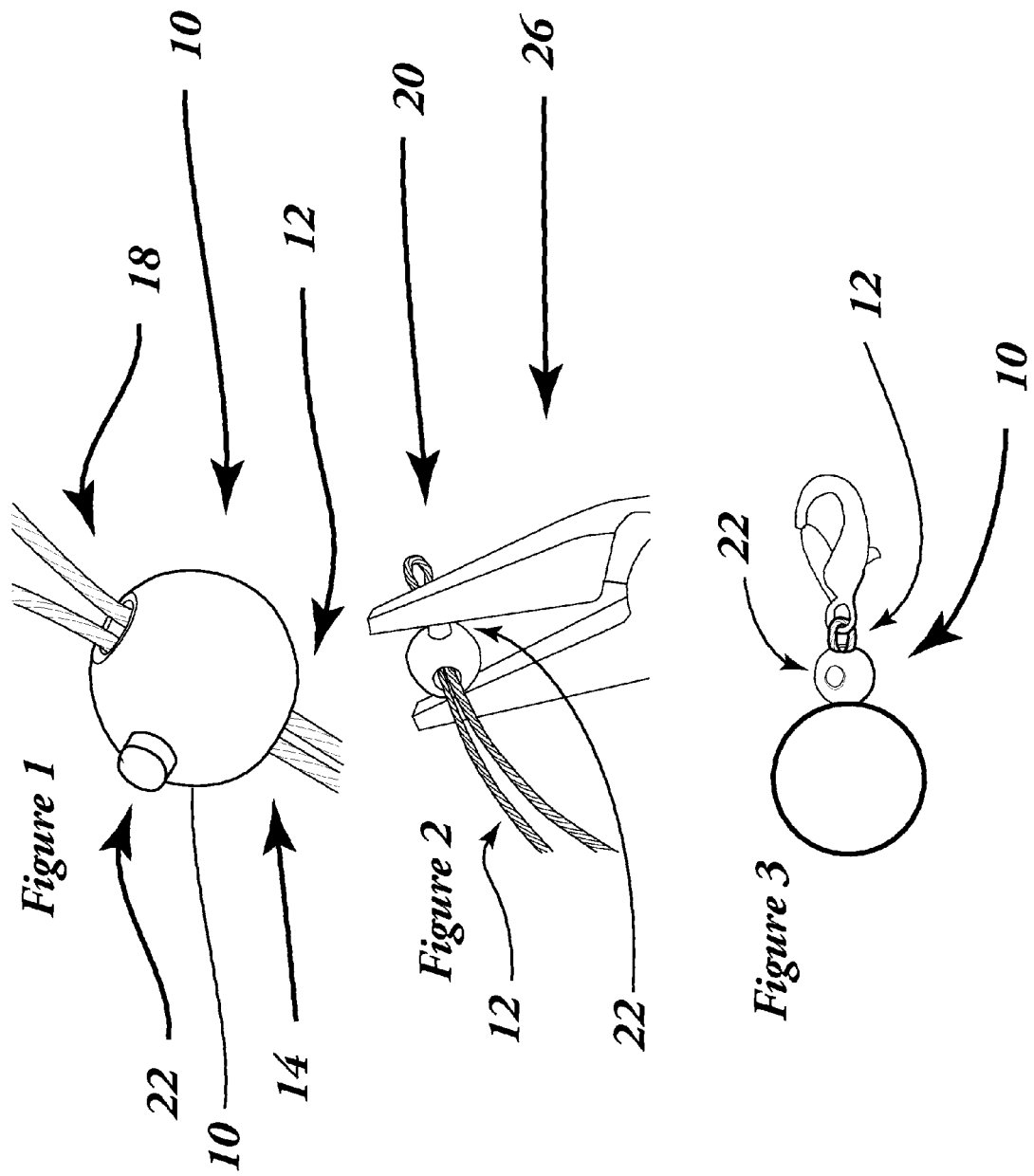

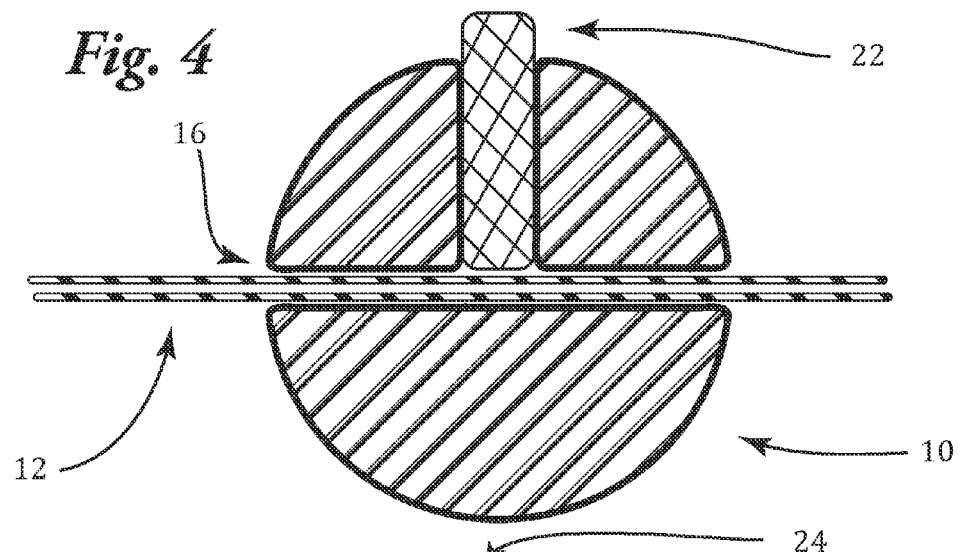
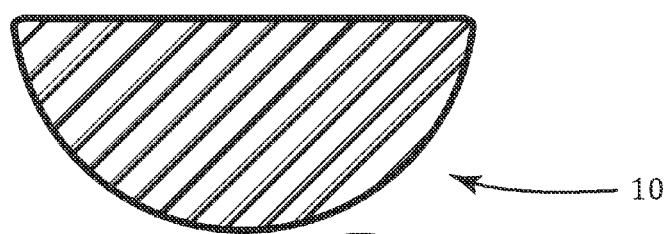
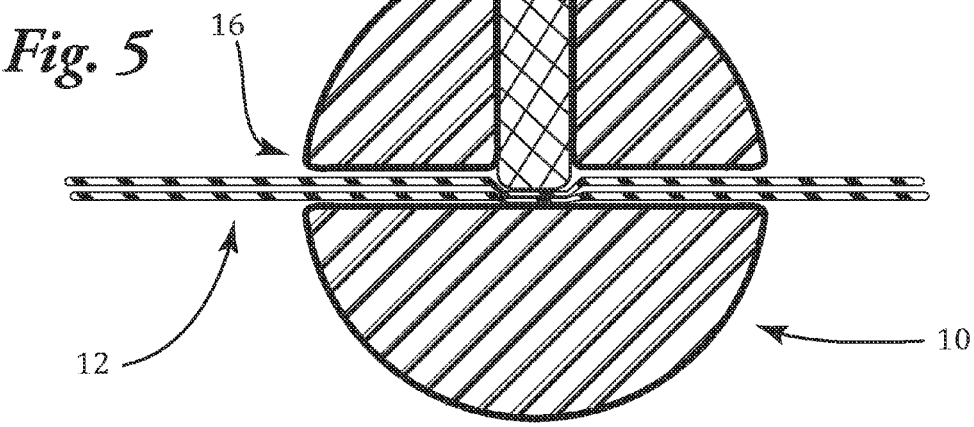

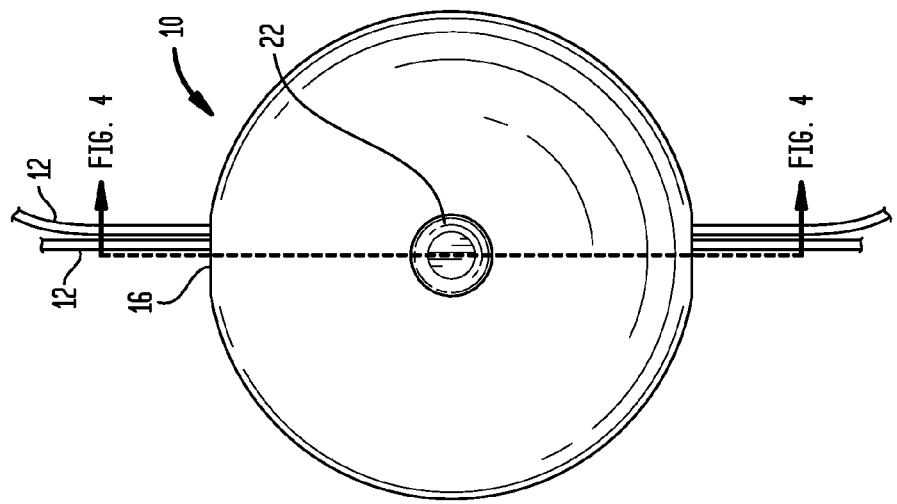
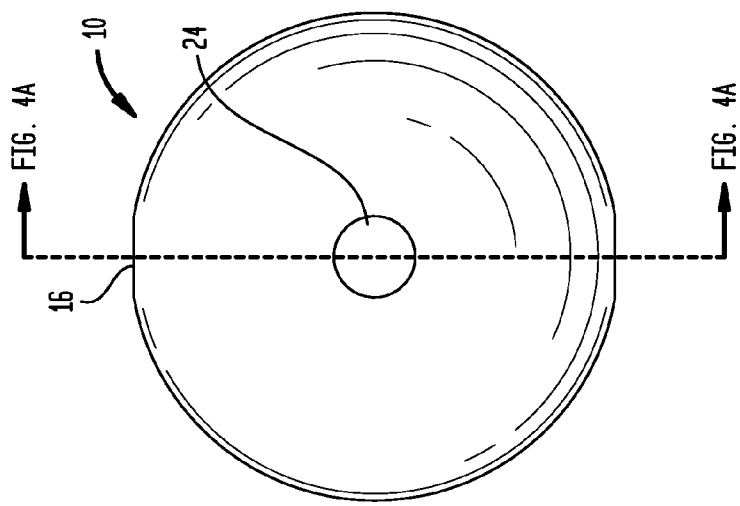
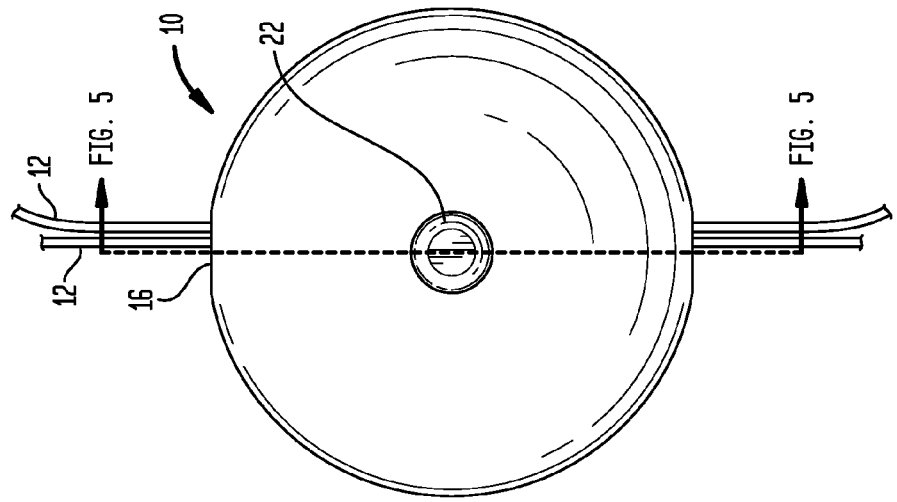

CRIMPING BEAD WITH PLUNGER

CLAIM FOR PRIORITY

This non-provisional application claims the benefit of the filing date of U.S. Provisional Patent Application Ser. No. 61/754,337, of the same title, filed Jan. 18, 2013. The priority of U.S. Provisional Patent Application Ser. No. 61/754,337 is hereby claimed and the disclosure thereof is incorporated into this application by reference.

Many hobbyists have taken up beading as a past time, making decorative jewelry and ornamental objects for their families and friends as well as themselves. One of the most common operations formed by beaders is wire crimping which is used to join the ends of the loops in a wide variety of applications including formation of necklaces, earrings, bracelets, bangles and the like. To form a strong durable join between two pieces of wire, beaders will typically use a so-called crimp tube which is quite effective in forming the desired bond or join but typically lacks the aesthetic appeal of the other elements in the necklace, bracelet or earring. Thus beaders often cover the crimp tube with a crimp cover which is typically a small (2-6 mm, more commonly 3-5 mm) hollow split spherical shell thus disposing an attractive, ornamental cover over the strong and durable but usually crudely formed crimped tube. However crimp tube covers are quite fragile and in the past have required considerable skill and delicacy to close without deforming the crimp tube cover and thereby defeating the entire purpose of using the crimp tube in the first place.

The present invention addresses these issues by providing a two-piece crimping bead having a through bore and an intersecting crimp bore having disposed therein a crimping plunger wherein the dimensions of the crimp bore and the crimping plunger are chosen such that, before use, the crimping plunger is retained by frictional forces within the crimping bore without protruding into the through bore but when the crimping plunger is forced into the crimp bore, such that the exterior surface of the crimping plunger is largely coincident with the adjacent surface of the crimping bead, the crimping plunger is strongly retained within the crimping bore by frictional forces. Preferably, the crimping plunger is a relatively hard generally cylindrical plug having a length which is sufficient to ensure that when forced into the crimp bore, it will engage and firmly retain any beading wire or wires passing through the through bore. Preferably, the crimping bead is comprised of brass having a hardness of about 38 on the Rockwell B (HRB) scale while the plunger is a tapered cylinder about 0.3 mm in diameter comprised of brass having a hardness of about 41 HRB and the crimp bore is slightly undersized by about 0.04 mm relative to the plunger so that the plunger can be urged into the crimp bore without requiring excessive forces that might lead to deformation of either the exterior surface of the crimp plunger or of the opposite surface of the crimping bead. The angle of taper of the plunger is preferably about 1 to 5°, more preferably about 1.5 to 4°, and most preferably about 2 to 3.5°. Preferably, the lateral surface of the plunger is unpolished with a matte finish.

DESCRIPTION OF THE DRAWINGS

The invention is described in detail below with reference to the various Figures, wherein:

FIGS. 1-3 illustrate the overall operation of the crimp bead of the present invention.

FIGS. 4, 4A and 5 are schematic sectional views illustrating urging of the plunger inwardly into the crimp bead to engage and retain beading wires passing therethrough. FIG. 4 is a sectional schematic of FIG. 7 taken along the line marked FIG. 4; FIG. 4A is a sectional schematic of FIG. 8 taken along the line marked FIG. 4A; and FIG. 5 is a sectional schematic of FIG. 9 taken along the line marked FIG. 5.

FIG. 7 is a front elevation of the crimp bead with the crimp plunger in a retracted position.

FIG. 8 is a front elevation of the crimp bead with the crimp plunger and wire absent.

FIG. 9 is a front elevation of the crimp bead with the crimp plunger in an engaged position.

DESCRIPTION OF THE PREFERRED EMBODIMENT

Figure 6:
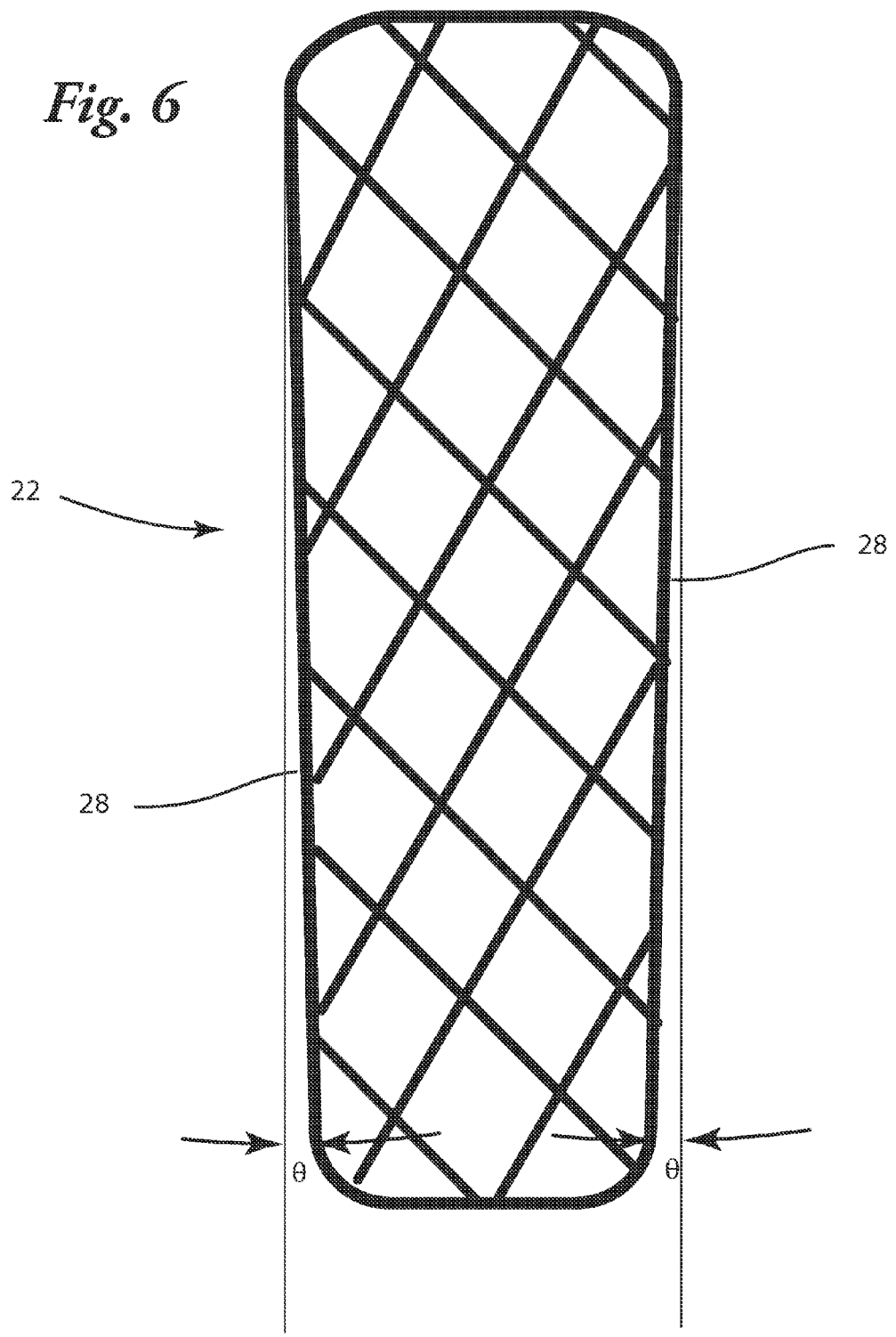
FIG. 6 illustrates details of the plunger.

The invention is described in detail below with reference to several embodiments. Such discussion is for purposes of illustration only. Modifications to examples within the spirit and scope of the present invention, set forth in the appended claims, will be readily apparent to one of skill in the art. Terminology used throughout the specification and claims herein is given its ordinary meaning.

In FIG. 1, crimp bead 10 has a loop of beading wire 12 entering lower opening 14 of through bore 16 and exiting upper opening 18 of through bore 16 with loop 20 formed adjacent upper opening 18 of through bore 16. In FIG. 1, crimp plunger 22 is in the retracted starting position protruding from crimp bore 24 while in FIG. 2 flat nosed pliers 26 are being used to urge crimp plunger 22 into crimp bore 24 to engage beading wire 12 in through bore 16. FIG. 3 illustrates the appearance of crimp bead 10 after crimp plunger 22 has been urged into crimp bore 24. It can be appreciated that crimp bead 10 presents a finished and unmarred aesthetically pleasing appearance.

In FIG. 4, beading wire 12 is disposed in through bore 16 while crimp plunger 22 is in its upward or retracted position. It can be observed that crimp plunger 22 and crimp bore 24 are in an interfering engagement-crimp plunger 22 is between 0.02 and 0.06 mm too large to move freely in crimp bore 24. As crimp plunger 22 is made of a slightly harder material than walls of crimp bore 24, when crimp plunger 22 is urged into crimp bore 24 as illustrated in FIG. 5, the walls of crimp bore 24 yield but bear tenaciously against crimp plunger 22 thereby fixing crimp plunger 22 in position holding it firmly against beading wire 12. Suitably, crimp bead 10 can be formed of brass having a hardness of 38 on the Rockwell scale while crimp plunger 22 can have a hardness of 41 on the Rockwell B scale. In FIG. 6, it can be observed that sidewalls 28 of crimp plunger 22 have a taper θ of about 2-3° while sidewalls 28 of plunger 22 have an unpolished surface, suitably having a matte finish.

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference, further description is deemed unnecessary. In addition, it should be understood that aspects of the invention and portions of various embodiments may be combined or interchanged either in whole or in part. Furthermore, those of ordinary skill in the art will appreciate that the foregoing description is by way of example only, and is not intended to limit the invention.

What is claimed is:

1. A two piece crimping bead, comprising a crimp bead and a crimping plunger, wherein:
the crimp bead has a through bore adapted to have a beading cable passed therethrough, said through bore having a first opening, a second opening, and a sidewall, said crimp bead also has a crimping bore intersecting said through bore, said crimping bore having a first opening, a second opening, and a sidewall;
the crimping plunger has a diameter exceeding a diameter of the crimping bore by at least 0.02 millimeters (mm); and
the crimping plunger is disposed within the crimping bore in interference fit with said crimping bore, such that when said crimping plunger is urged into said crimping bore, said crimping plunger protrudes into said through bore and said crimping plunger is fixed in position holding said crimping plunger firmly against said beading cable to retain said beading cable against the sidewall of the through bore.

2. The two-piece crimping bead of claim 1, wherein the diameter of said crimping plunger exceeds the diameter of said crimping bore by between 0.02 and 0.06 mm.

3. The two-piece crimping bead of claim 1, wherein the crimping plunger has a hardness which exceeds a hardness of said crimp bead.

4. The two piece crimping bead of claim 1, wherein said crimp bead and said crimping plunger are brass.

5. The two-piece crimping bead of claim 1, wherein the crimping plunger has a hardness exceeding a hardness of said crimp bead by at least 1.5 points on the Rockwell B scale.

6. The two-piece crimping bead of claim 1, wherein the crimping plunger has a hardness exceeding a hardness of said crimp bead by at least 2 points on the Rockwell B scale.

7. The two-piece crimping bead of claim 1, wherein the crimping plunger has a hardness exceeding a hardness of said crimp bead by at least 2.5 points on the Rockwell B scale.

8. The two-piece crimping bead of claim 1, wherein the crimping plunger has a hardness exceeding a hardness of said crimp bead by at least 3 points on the Rockwell B scale.

9. The two piece crimping bead of claim 1, wherein said crimp bead is comprised of brass having a hardness of 38 on the Rockwell B scale and said crimping plunger is comprised of brass having a hardness of 41 on the Rockwell B scale.

10. A two piece crimping bead comprising a crimp bead and a crimping plunger, said crimp bead having a through bore having a first opening, a second opening, and a sidewall, said through bore being adapted to have a beading cable passed therethrough, said crimp bead also having a crimping bore intersecting said through bore and having a crimping plunger disposed therein in interference fit with said crimping bore such that when said crimping plunger is urged into said crimping bore, said crimping plunger protrudes into said through bore and said crimping plunger is fixed in position holding said crimping plunger firmly against said beading cable to retain said beading cable against the sidewall of the through bore.

11. The two piece crimping bead of claim 10, wherein the crimping plunger has a hardness exceeding that of said crimp bead by at least 3 points on the Rockwell B scale.

12. The two piece crimping bead of claim 10, wherein said crimp bead is comprised of brass having a hardness of 38 on the Rockwell B scale and said crimping plunger is comprised of brass having a hardness of 41 on the Rockwell B scale.

* * * * *